United States Patent
Bell et al.

(10) Patent No.: US 9,569,670 B2
(45) Date of Patent: Feb. 14, 2017

(54) DESTINATION AND DURATION OF STAY DETERMINATION IN A GEOGRAPHICALLY BOUNDED AREA

(75) Inventors: David Bell, Winchester (GB); Chris Phillips, Winchester (GB)

(73) Assignee: International Business Machines Corporation, Armonk, NY (US)

(*) Notice: Subject to any disclaimer, the term of this patent is extended or adjusted under 35 U.S.C. 154(b) by 1205 days.

(21) Appl. No.: 13/172,992

(22) Filed: Jun. 30, 2011

(65) Prior Publication Data
US 2013/0006425 A1    Jan. 3, 2013

(51) Int. Cl.
*G06N 5/04* (2006.01)
*G06K 9/00* (2006.01)
*G08B 21/04* (2006.01)
*H05B 37/02* (2006.01)

(52) U.S. Cl.
CPC ....... *G06K 9/00771* (2013.01); *G08B 21/0423* (2013.01); *H05B 37/0227* (2013.01)

(58) Field of Classification Search
USPC .................. 700/49, 50, 275, 276, 286, 295
See application file for complete search history.

(56) References Cited

U.S. PATENT DOCUMENTS 6,263,260 B1 *  7/2001  Bodmer et al. ............... 700/275

\* cited by examiner

*Primary Examiner* — Carlos Ortiz Rodriguez
(74) *Attorney, Agent, or Firm* — Steven M. Greenberg, Esq.; CRGO Law

(57) ABSTRACT

A method for destination and duration of stay determination in a geographically bounded area such as a smart home includes detecting movement by an identified individual in an origination location of a geographically bounded area and retrieving a contemporaneously generated pattern of movement for the individual. The method additionally includes comparing the pattern for the identified individual to a set of patterns in a pattern data store and predicting from a matching pattern both a destination location in the geographically bounded area and a duration of time at which the identified individual is to remain at the destination location. Finally, the method includes directing activation of a fixture at the destination location responsive to predicting the destination location, and directing deactivation of a fixture at the origination location responsive to predicting a duration of time that exceeds a threshold value.

18 Claims, 1 Drawing Sheet

DESTINATION AND DURATION OF STAY DETERMINATION IN A GEOGRAPHICALLY BOUNDED AREA

BACKGROUND OF THE INVENTION

Field of the Invention

The present invention relates to pattern recognition and more particularly to home automation utilizing pattern recognition of occupant behavior.

Description of the Related Art

Pattern recognition is a computational algorithm used to classify raw, observed data. The term "pattern recognition stems from machine learning, but has been adapted by cognitive psychologists to describe various theories for how the human brain progresses from incoming sensory information to action selection. The various stages of pattern recognition include the sensing of an environment to detect source data, feature detection in the incoming data, data classification based upon features, and action selection based upon classification. Pattern recognition algorithms have been applied to the behavior of individuals and also to the movements of individuals and vehicles in order to enable predictive organizational systems—in particular traffic flow and management systems and in animal tracking studies.

In a traffic flow and management system, the movements of vehicles are observed over time in order to predict the route and timing of departure of different vehicles. Known formally as travel pattern analysis, the route and timing of departure of different vehicles can be tracked so that traffic patterns for entire communities can be predicted, road construction requirements planed, and traffic lights timed accordingly. In comparison, pattern analysis as applied to the movements of animals has be used scientifically to predict migratory patterns of animals in the wild.

Qualitatively, pattern analysis can be used to identify an individual. In this regard, when an individual repeats the same pattern of movement over time, and such movement is documented as a pattern, a person subsequently engaging in the same pattern of movement can be presumed to be the individual. Pattern analysis of the movement of individuals also finds application in homeland security with particular movements being associated with suspicious behavior. Notwithstanding, pattern matching appears not to have been widely utilized in the implementation of a smart home.

BRIEF SUMMARY OF THE INVENTION

Embodiments of the present invention address deficiencies of the art in respect to smart home management and provide a novel and non-obvious method, system and computer program product for destination and duration of stay determination in a geographically bounded area such as a smart home. In an embodiment of the invention, a method of pattern matching determination of destination and duration of stay in a geographically bounded area is provided. The method includes detecting movement by an identified individual in an origination location of a geographically bounded area and retrieving a contemporaneously generated pattern of movement for the identified individual. The method additionally includes comparing the contemporaneously generated pattern of movement for the identified individual to a set of patterns in a pattern data store and predicting from a matching pattern in the set of patterns both a destination location in the geographically bounded area and a duration of time at which the identified individual is to remain at the destination location. Finally, the method includes directing activation of a fixture at the destination location responsive to predicting the destination location, and directing deactivation of a fixture at the origination location responsive to predicting a duration of time that exceeds a threshold value.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for pattern matching determination of destination and duration of stay in a geographically bounded area such as a smart home. In accordance with an embodiment of the invention, a data store of movement patterns can be established, for example in the form of a neural net of states. Each pattern can include a sequence of locations and a duration of stay at each location. Each pattern further can be unique to a specific individual, or can be generalized for a set of individuals. In the latter instance, the data store of movement patterns can be reduced to include a set of generalized patterns each for patterns which are duplicative for different individuals, and then a set of unique patterns which are unique to different individuals.

The movements of different individuals within a geographic bound such as a house or building can be monitored with different sensors. When movement is detected for an individual at an origination location within the geographic bound, the identity of the individual can be determined, for example through biometrics like facial recognition, voice recognition or gait recognition, or through the sensing of an external identification device such as an radio frequency identification (RFID) tag, or wirelessly broadcast signal such as that from a cellular telephone, laptop computer or personal digital assistant (PDA). A state machine can be maintained for the movements of the different individuals and the movement detected for the identified individual can be processed in the state machine.

A pattern evident from the state machine for the identified individual can be compared to the patterns in a data store of patterns or in the neural net to determine if a matching pattern can be found, either for the identified individual or for a generalized set of individuals. If so, a next location can be predicted and a fixture in the geographic location such as a door, electric light, heater, fan or air conditioner can be activated at the next location. Additionally, a likely duration of absence from the originating location can be determined and if the duration exceeds a threshold value, a fixture in the originating location such as a door, light, heater, fan or air conditioner can be deactivated.

Figure 1:
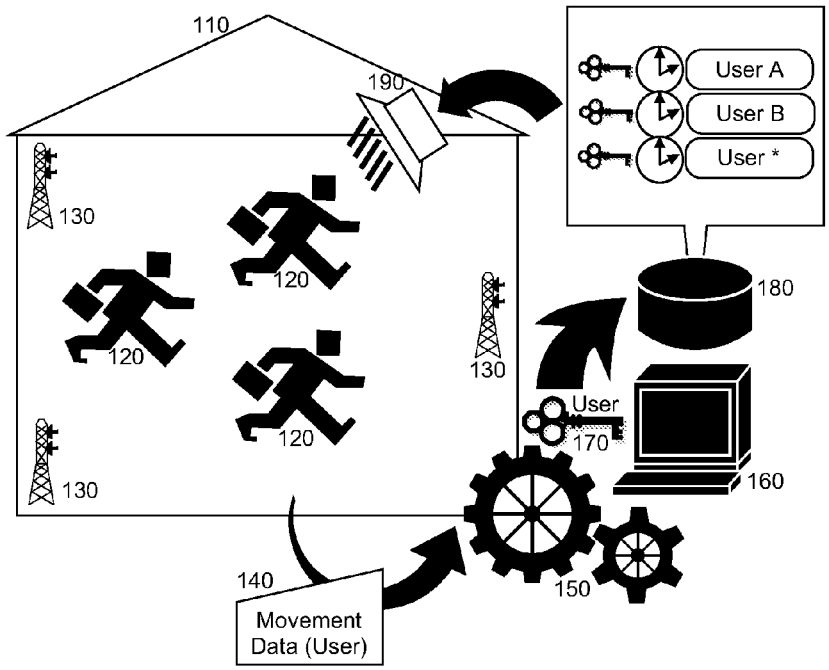
FIG. 1 is a pictorial illustration of a process for pattern matching determination of destination and duration of stay in a geographically bounded area.

In further illustration, FIG. 1 pictorially shows a process for pattern matching determination of destination and duration of stay in a geographically bounded area such as a smart home. As shown in FIG. 1, different individuals 120 within a geographically bounded area such as a smart home 110 can be monitored for movement by different sensors 130 such as motion sensors. In response to detection movement by an identified one of the individuals 120 in an originating location of the smart home 110, pattern matching home automation control logic 150 executing in a computer 160 can process the movement data 140 for the identified one of the individuals 120. In particular, the processing can include computing a contemporaneous pattern 170 of movement for the identified one of the individuals 120 and comparing the same to a data store of patterns 180.

In particular, the data store of patterns 180 provides not only a sequence of locations within the smart home 110 for both unique ones of the individuals 120 and also for a generalized set of the individuals 120, but also the data store of patterns provides a duration of stay at each of the locations. Upon detecting a match of the movement data 140 to a particular pattern in the data store of patterns 180, the pattern matching home automation control logic 150 can intelligently control fixtures at either or both of the origination location and a predicted destination location in the smart home 110. In this way, the smart home 110 can be managed intelligently based upon the predicted movements of the individuals 120 within the smart home and the duration of time during which the individuals 120 reside at any given location in the smart home 110.

Figure 2:
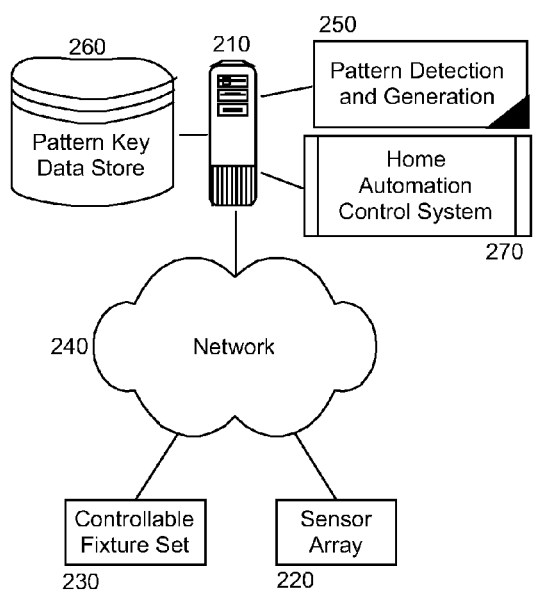
FIG. 2 is a schematic illustration of a smart home data processing system configured for pattern matching determination of destination and duration of stay; and, FIG. 3 is a flow chart illustrating a process for pattern matching determination of destination and duration of stay in a geographically bounded area.

The process described in connection with FIG. 1 can be implemented in a smart home data processing system. In yet further illustration, FIG. 2 schematically shows a smart home data processing system configured for pattern matching determination of destination and duration of stay. The system can include a host server 210. The host server 210 can include at least one processor and memory and can be coupled over computer communications network 240 to a sensor array 220 of sensors disposed about a geographically bounded area, such as a smart building or smart home. A set of the sensors in the sensor array 220 can be configured to detect movement. Additionally, another set of sensors in the sensor array 220 can be configured to identify an individual, either by wirelessly receiving identity information from the individual, or through biometrics such as face or gait recognition.

A home automation control system 270 can be coupled to the host server 210. The home automation control system 270 can manage one or more fixtures in a fixture set 230, such as the activation and deactivation of different lights, fans, heaters, air conditioning system, and the like. Of note, pattern detection and generation module 250 can execute in the memory of the host server 210. The module 250 can include program code that when executed by the host server 210 can be enabled to generate different patterns in a pattern data store 260 for different individuals based upon the sensed movement of the individuals about the geographically bounded area and a duration of time at which individuals remain in a particular location within the geographically bounded area.

In this regard, the geographically bounded area can be subdivided into sectors are discrete areas, such as rooms, and each sector can be considered a state in a neural net. The movement of an individual from one sector to another can be reflected in a state transition from one state associated with the originating sector to another state associated with the destination sector and each state can indicate a duration of time during which an individual remains in a corresponding sector. Thus, a pattern can reflect a path of different states in the neural net representative of a route of travel throughout the geographically bounded area. Of note, while different patterns in the pattern data store 260 can be specific and unique to different individuals, patterns which are common to multiple individuals can be marked as common and not in association with any particular individual.

The program code of the module 250 additionally can be enabled to detect movement by an identified individual in an originating location within the geographically bounded area. A sequence of movements of the identified individual can be monitored, including previous movements leading to the originating location, and compared to the patterns in the pattern data store 260 in order to predict a destination location in the geographically bounded area. While the comparison can exclude those patterns associated without other individuals, the comparison can include patterns not only associated with the identified individual, but also common patterns. Finally, the duration of time expected of the identified individual at the destination location can be determined from the pattern. Based upon the determined duration of time and the predicted destination location, the home automation control system 270 can be directed to deactivate one or more fixtures in the fixture set 230 in the originating location, or to activate one or more fixtures in the fixture set 230 in the destination location, or both.

Figure 3:
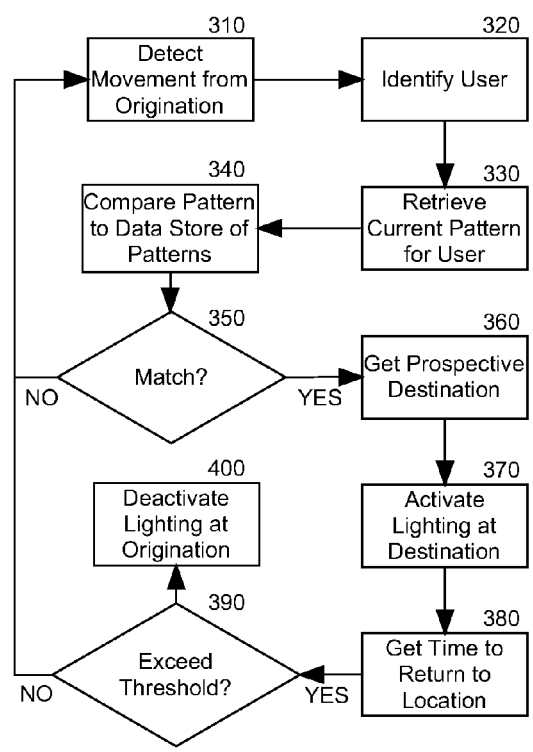

In even yet further illustration of an exemplary operation of the pattern detection and generation module 250, FIG. 3 is a flow chart illustrating a process for pattern matching determination of destination and return time in a smart home. Beginning in block 310, movement can be detected for an individual at an origination location and in block 320 the individual can be identified. In block 330, a current pattern of movement can be retrieved for the individual and in block 340, the current pattern can be compared to a data store of patterns including not just patterns previously generated for the individual, but also patterns previously generated for multiple different individuals and determined to be common to the different individuals.

In decision block 350, it can be determined if a match can be found. If so, in block 360 a predicted destination location can be determined by assessing a next state in the matched pattern from the state in the matched pattern corresponding to the originating location. Thereafter, in block 370 lighting can be activated at the destination location. In block 380, a duration of time during which the individual is expected to remain in the destination can be determined from the matched pattern. In decision block 390, if the duration of time exceeds a threshold value, in block 400 lighting can be deactivated at the origination location.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method of pattern matching determination of destination and duration of stay in a geographically bounded area, the method comprising:
    detecting movement by an identified individual in an origination location of the geographically bounded area;
    retrieving a contemporaneously generated pattern of movement for the identified individual;
    comparing the contemporaneously generated pattern of movement for the identified individual to a set of patterns in a pattern data store;
    predicting from a matching pattern in the set of patterns both a destination location in the geographically bounded area and a duration of time at which the identified individual is to remain at the destination location; and,
    directing activation of a fixture at the destination location responsive to predicting the destination location, and directing deactivation of a fixture at the origination location responsive to predicting the duration of time that exceeds a threshold value.

2. The method of claim 1, wherein the contemporaneously generated pattern of movement for the identified individual is compared to a set of patterns in the pattern data store that includes both patterns unique to the identified individual, and also patterns that are common to many different individuals.

3. The method of claim 1, wherein the geographically bounded area is a smart home.

4. The method of claim 1, wherein the fixture is an electric light.

5. The method of claim 1, wherein the pattern data store is a neural net of movement states.

6. The method of claim 1, wherein the identified individual is identified by way of biometric identification.

7. A smart home data processing system configured for pattern matching determination of destination and duration of stay comprising:
    a host server with at least one processor and memory communicatively coupled over a computer communications network to a sensor array of sensors disposed about a geographically bounded area;
    a home automation system configured to activate and deactivate fixtures in different locations of the geographically bounded area; and,
    a pattern detection and generation module coupled to the home automation system and the sensor array and comprising program code executing in the host server, the program code being enabled to respond to movement detected by the sensor array for an identified individual in an origination location of the geographically bounded area by:
    retrieving a contemporaneously generated pattern of movement for the identified individual;
    comparing the contemporaneously generated pattern of movement for the identified individual to a set of patterns in a pattern data store;
    predicting from a matching pattern in the set of patterns both a destination location in the geographically bounded area and a duration of time at which the identified individual is to remain at the destination location; and,
    directing the home automation system to activate a fixture at the destination location responsive to predicting the destination location, and directing the home automation system to deactivate a fixture at the origination location responsive to predicting the duration of time that exceeds a threshold value.

8. The system of claim 7, wherein the contemporaneously generated pattern of movement for the identified individual is compared to a set of patterns in the pattern data store that includes both patterns unique to the identified individual, and also patterns that are common to many different individuals.

9. The system of claim 7, wherein the geographically bounded area is a smart home.

10. The system of claim 7, wherein the fixture is an electric light.

11. The system of claim 7, wherein the pattern data store is a neural net of movement states.

12. The system of claim 7, wherein the identified individual is identified by way of biometric identification.

13. A computer program product for pattern matching determination of destination and duration of stay in a geographically bounded area, the computer program product comprising:
    a non-transitory computer readable storage medium having computer readable program code embodied therewith, the computer readable program code comprising:
    computer readable program code for detecting movement by an identified individual in an origination location of the geographically bounded area;
    computer readable program code for retrieving a contemporaneously generated pattern of movement for the identified individual;
    computer readable program code for comparing the contemporaneously generated pattern of movement for the identified individual to a set of patterns in a pattern data store;
    computer readable program code for predicting from a matching pattern in the set of patterns both a destination location in the geographically bounded area and a duration of time at which the identified individual is to remain at the destination location; and,
    computer readable program code for directing activation of a fixture at the destination location responsive to predicting the destination location, and directing deactivation of a fixture at the origination location responsive to predicting the duration of time that exceeds a threshold value.

14. The computer program product of claim 13, wherein the contemporaneously generated pattern of movement for the identified individual is compared to a set of patterns in the pattern data store that includes both patterns unique to the identified individual, and also patterns that are common to many different individuals.

15. The computer program product of claim 13, wherein the geographically bounded area is a smart home.

16. The computer program product of claim 13, wherein the fixture is an electric light.

17. The computer program product of claim 13, wherein the pattern data store is a neural net of movement states.

18. The computer program product of claim 13, wherein the identified individual is identified by way of biometric identification.

* * * * *